Nov. 29, 1955 H. H. OBERGFELL 2,725,028
COMBINED ADJUSTING AND INDICATING MEANS
Filed Sept. 8, 1953 3 Sheets-Sheet 1

INVENTOR.
Howard H. Obergfell
BY

Nov. 29, 1955  H. H. OBERGFELL  2,725,028
COMBINED ADJUSTING AND INDICATING MEANS
Filed Sept. 8, 1953  3 Sheets-Sheet 2

INVENTOR.
Howard H. Obergfell
BY

INVENTOR.
Howard H. Obergfell

United States Patent Office 2,725,028
Patented Nov. 29, 1955

2,725,028

COMBINED ADJUSTING AND INDICATING MEANS

Howard H. Obergfell, Albuquerque, N. Mex., assignor, by mesne assignments, to the United States of America as represented by the United States Atomic Energy Commission Application September 8, 1953, Serial No. 382,504

1 Claim. (Cl. 116—124)

The present invention relates to means for indicating the extent of movement and position of an object.

In many instances it is desirable to employ means for moving an object or objects and accurately indicating the extent of movement and position thereof; such objects may be, for example, adjustable capacitor plates or members. The present invention aims to achieve such results by providing a rotatable threaded member or shaft for shifting the position of an object therealong and simultaneously turning a cam so as to actuate a pointer or indicator member to show the extent of movement and position of the object on an adjacent scale or dial.

An object of the present invention is to provide new and improved means for indicating the extent of movement and position of an object or member.

Another object of the invention is to provide improved means for accurately indicating the excursion and position of a member in response to angular movement of a controlling member.

A further object of the invention is to provide movement indicating means of relatively simple and compact construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise from disclosed. It is chosen and described in order to best explain the principles of the invention and their application in practical use to thereby enable others skilled in the art to best utilize the invention in various embodiments and modifications as are best adapted to the particular use contemplated.

In the accompanying drawings.

As shown in Figs. 1-4, the device of the present invention comprises a reciprocable member 1 in threaded engagement with a threaded portion of a rotatable operating shaft 2 and restrained against rotation with the shaft 2 by one or more stationary guide rods 4 that penetrate openings in the reciprocable member 1 and are disposed generally parallel to the shaft 2. When the shaft 2 is rotated, by turning the knob 5, for example, the interengaging threads of the shaft and reciprocable member cause the latter member to slide along the guide rods 4 in one direction or the other longitudinally of the operating shaft 2.

The interengaging threads of the shaft 2 and reciprocable member 1 are preferably of the multiple type, for example, triple thread with ¼ lead and ¹⁄₁₂ pitch in order to facilitate movement of the reciprocable member longitudinally of the shaft 2 upon rotation of the latter. The direction of movement of the reciprocable member is, of course, controlled by the direction of rotation of the operating shaft.

Figure 1:
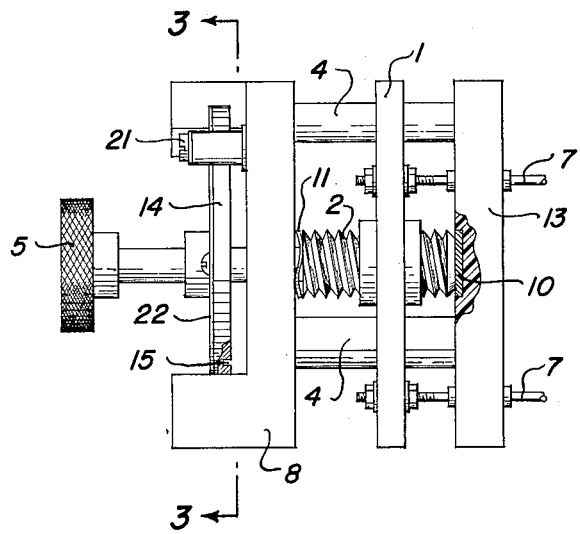
Fig. 1 is a side elevational view showing a preferred embodiment of the present invention.
Figure 2:
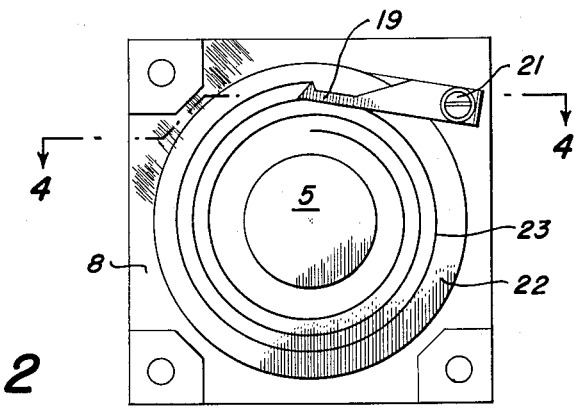
Fig. 2 is an end view of the device illustrated in Fig. 1.
Figure 3:
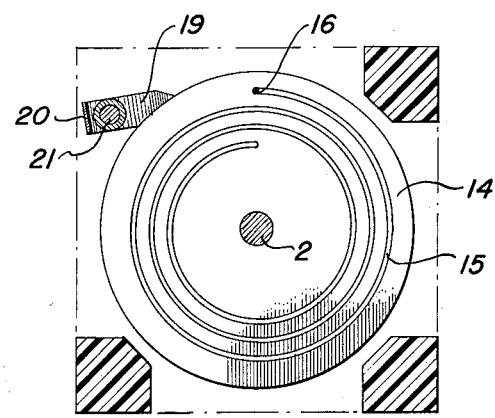
Fig. 3 is a sectional view taken along line 3—3 of Fig. 1.
Figure 4:
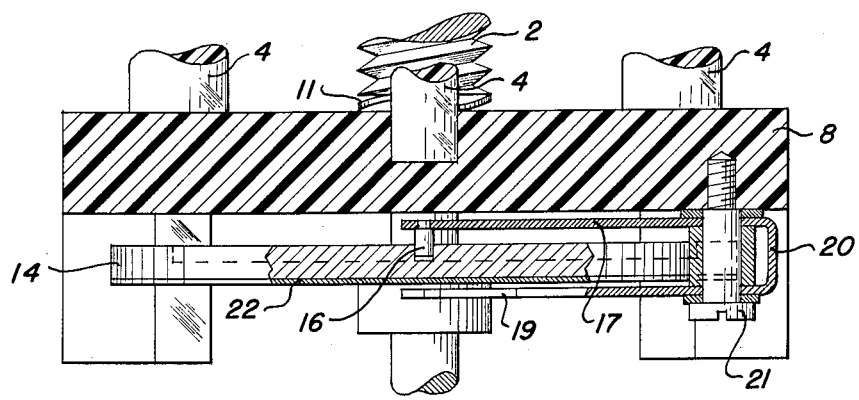
Fig. 4 is an enlarged sectional view taken generally along line 4—4 of Fig. 2.

Apparatus to be controlled or positioned, for example, adjustable plates of a capacitor, may be connected with the reciprocable member 1 in any suitable manner and thus adjusted in response to rotation of the operating shaft 2. As shown in Fig. 1, the elements 7 may themselves comprise capacitor portions reciprocable through guiding openings in a guide block or housing 13, or capacitor portions may be attached to the elements 7 for movement with the reciprocable member 1.

The rotatable operating shaft 2 may extend through an aperture of and be carried by a mounting plate 8 and its inner end portion may be urged into contact with a bearing disc 10 by a spring washer 11, the bearing disc being imbedded in or otherwise attached to the guide block or housing 13. The mounting plate 8 and guide block 13 may be maintained in fixedly spaced relationship by securing end portions of the guide rods 4 thereto.

The means shown for indicating the excursion and position of reciprocable member 1, and thus of the members 7, includes a disc member 14 fixedly secured to and rotatable with the operating shaft 2, having a spiral groove or rib 15 at one face thereof for moving a cam follower 16 and arm 17. As the operating shaft 2 is turned, different portions of the spiral cam contact the cam follower 16 and move it toward or away from the longitudinal axis of shaft 2, the direction of movement depending upon the direction of shaft rotation. As the cam follower is attached to the arm 17, it correspondingly moves the arm and the latter serves to move a pointer or indicator arm 19 shown connected with the cam follower arm by an interconnecting portion 20. The generally U-shaped element which includes the cam follower 16, arm 17 and the pointer arm 19 may be rotatably supported on a pin or screw 21 carried by the mounting plate 8.

The pointer arm 19 travels over a portion of a dial 22 shown positioned opposite the spirally grooved face of the disc member 14 and the extent of rotation of control shaft 2 and consequent movement of the reciprocable member 1 along the shaft may be indicated by suitably marking and calibrating the dial face. In Figs. 1-4 the spiral cam is shown as a groove of at least three convolutions and the face of the dial carries a spiral marking 23 generally similar to the spiral cam groove. The pointer arm 19 will thus indicate which turn of the operating shaft 2 is being followed and suitable graduations (not shown) along the spiral marking may indicate the portion of the turn at which the reciprocable member is positioned. Any suitable and desired number of convolutions, either more or less than a single convolution, may be carried by the disc and dial members 14 and 22.

Figure 5:
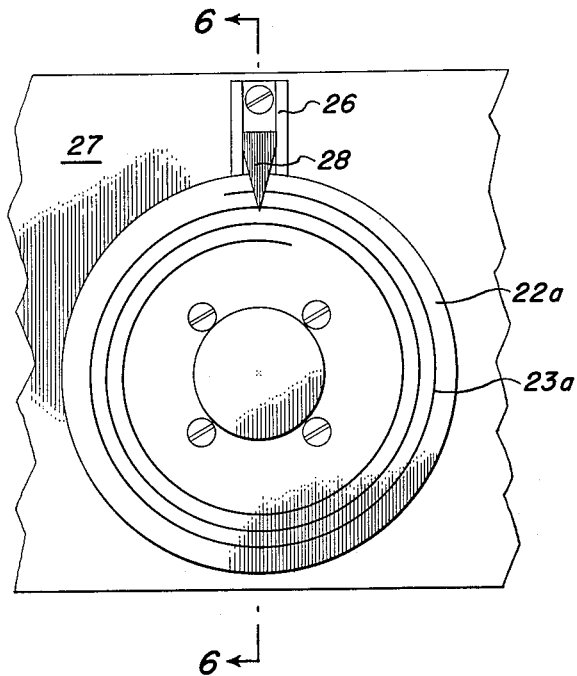
Fig. 5 is a fragmentary elevational view showing another form of the invention.
Figure 6:
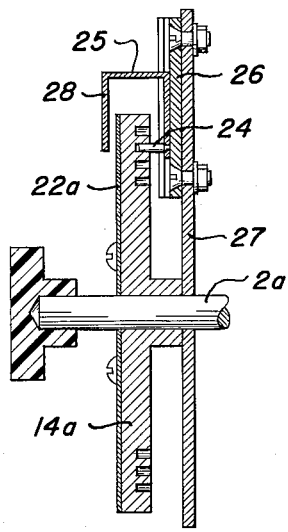
Fig. 6 is a sectional view taken on line 6—6 of Fig. 5.

In Figs. 5 and 6 there is shown a modified form of the invention which may be preferred for use in some instances. As there shown, a cam follower 24 is carried by a reciprocable member or block 25 positioned on and guided by a trackway 26, the trackway 26 being secured to a stationary mounting plate or panel 27. As the operating shaft 2a is rotated, it turns with it the disc member 14a to move the cam follower 24 and block 25 along the trackway 26. A pointer member 28 carried by the block 25 is thus correspondingly moved over the face of a dial member 22a to indicate on the spiralled dial marking 23a the excursion and position of a reciprocable member (not shown), which has its movement controlled by shaft 2a and interengaging threads (not shown) in manner similar to that described in connection with the preferred embodiment.

It will be seen that the present invention provides a new and improved device of relatively simple, compact and inexpensive construction for accurately indicating the extent of movement and position of an adjustable member. The adjustable member may be operatively connected with any apparatus or element whose movement is to be measured.

As various changes may be made in the form, construction and arrangement of the parts herein without departing from the spirit and scope of the invention and without sacrificing any of its advantages, it is to be understood that all matter herein is be to be interpreted as illustrative and not in a limiting sense.

I claim:

A device for adjusting and indicating the position of a member longitudinally of a threaded shaft with which it is in threaded engagement comprising means retaining said member against angular movement with the shaft, disc means secured to and rotatable with said shaft provided at one face with a cam and at an opposite face with indicating marking, a substantially U-shaped member rotatably secured adjacent the closed end thereof to a portion of said retaining means at a location adjacent the periphery of said disc means with said closed end spanning the periphery of the disc means, one arm of the U-shaped member extending inwardly along said one face of the disc means and having a cam follower portion in engagement with the cam, and the other arm of the U-shaped member extending inwardly along said opposite face of the disc means and provided with a portion terminating adjacent said indicating marking, whereby rotation of the disc means and movement of its cam effects swinging of both arms of the U-shaped member about said closed end and movement of the said other arm over said other face of the disc means.

References Cited in the file of this patent

UNITED STATES PATENTS

| 1,694,384 | Herman | Dec. 11, 1928 |
| 2,400,553 | Howard | May 21, 1946 |

FOREIGN PATENTS

| 199,714 | Switzerland | Sept. 15, 1938 |